(12) United States Patent
Carter (10) Patent No.: US 10,896,562 B2
(45) Date of Patent: Jan. 19, 2021

(54) SECURED DELIVERY SYSTEM AND METHOD OF USING SAME

(71) Applicant: Ronald Carter, Matthews, NC (US)

(72) Inventor: Ronald Carter, Matthews, NC (US)

(73) Assignee: 1AHEAD Technologies, Charlotte, NC (US)

( * ) Notice: Subject to any disclaimer, the term of this patent is extended or adjusted under 35 U.S.C. 154(b) by 0 days.

(21) Appl. No.: 16/593,340

(22) Filed: Oct. 4, 2019

(65) Prior Publication Data

US 2020/0035050 A1     Jan. 30, 2020

Related U.S. Application Data

(63) Continuation-in-part of application No. 15/938,846, filed on Mar. 28, 2018, now Pat. No. 10,475,259.

(60) Provisional application No. 62/861,061, filed on Jun. 13, 2019, provisional application No. 62/481,096, filed on Apr. 3, 2017.

(51) Int. Cl.
| | | |
|---|---|---|
| *G07C 9/00* | (2020.01) | |
| *G06K 7/14* | (2006.01) | |
| *G06Q 10/08* | (2012.01) | |
| *H04W 12/08* | (2009.01) | |
| *H04W 4/029* | (2018.01) | |
| *G07C 9/20* | (2020.01) | |

(52) U.S. Cl.
CPC ....... *G07C 9/00571* (2013.01); *G06K 7/1417* (2013.01); *G06Q 10/0832* (2013.01); *G06Q 10/0833* (2013.01); *G06Q 10/08355* (2013.01); *G07C 9/00896* (2013.01); *G07C 9/00944* (2013.01); *G07C 9/215* (2020.01); *H04W 4/029* (2018.02); *H04W 12/08* (2013.01); *G07C 2009/00785* (2013.01); *G07C 2009/00936* (2013.01)

(58) Field of Classification Search
CPC ............ G07C 9/00896; G07C 9/00912; G07C 9/00571; G07C 9/00309; G07C 9/00103; G07C 2209/08; G07C 2009/00936; G07C 2009/00793; G07C 9/00182; G07C 9/00142
USPC ....................................................... 340/5.73
See application file for complete search history.

(56) References Cited

U.S. PATENT DOCUMENTS

| | | | | |
|---|---|---|---|---|
| 8,667,297 | B2 * | 3/2014 | Salter ..................... | H03M 11/02 713/186 |
| 9,365,188 | B1 * | 6/2016 | Penilla .................. | B60R 25/241 |
| 9,499,128 | B2 * | 11/2016 | Reh ......................... | G06Q 50/30 |
| 9,508,207 | B2 * | 11/2016 | Kalb .................. | G07C 9/00571 |
| 9,608,970 | B1 * | 3/2017 | Gehret .................. | H04W 12/04 |

(Continued)

FOREIGN PATENT DOCUMENTS

CN        105894629 A   *   8/2016

*Primary Examiner* — Yong Hang Jiang
(74) *Attorney, Agent, or Firm* — Jeffrey Watson; Mathew Grell; Grell & Watson Patent Attorneys LLC (57) ABSTRACT

A secured delivery system can include a doorbell device comprising a scanner, and a locking mechanism operatively connected to the scanner, a computer processor or a cloud server and a structure, such as a residence or lockbox. A key, which can be in the form of a bar code, can be generated and sent to delivery or service personnel needing access to the structure. The delivery or service personnel present the bar code to the scanner. Upon reading the bar code, the locking mechanism is unlocked thereby allowing access to the structure.

11 Claims, 2 Drawing Sheets

(56) References Cited

U.S. PATENT DOCUMENTS

| | | | | |
|---|---|---|---|---|
| 9,640,040 B2* | 5/2017 | Irudayam | ............ | G06Q 20/1085 |
| 9,646,165 B1* | 5/2017 | Saylor | .................... | E05B 49/00 |
| 9,805,534 B2* | 10/2017 | Ho | .................... | G07C 9/00563 |
| 9,842,447 B2* | 12/2017 | Badger, II | ............. | B60R 25/102 |
| 9,870,698 B2* | 1/2018 | Rabb | .................... | G08B 25/008 |
| 9,911,290 B1* | 3/2018 | Zalewski | ............... | G06Q 20/12 |
| 9,922,513 B1* | 3/2018 | Hall | .................... | G08B 13/196 |
| 9,923,879 B1* | 3/2018 | Ziraknejad | .............. | H04L 63/06 |
| 9,978,238 B2* | 5/2018 | Fadell | .................. | G08B 19/005 |
| 10,043,332 B2* | 8/2018 | Scalisi | ................ | G07C 9/00111 |
| 10,147,249 B1* | 12/2018 | Brady | ................ | G07C 9/00174 |
| 2014/0035721 A1* | 2/2014 | Heppe | ................ | G07C 9/00571 |
| | | | | 340/5.54 |
| 2014/0274013 A1* | 9/2014 | Santavicca | ......... | G07C 9/00309 |
| | | | | 455/418 |
| 2014/0373111 A1* | 12/2014 | Moss | .................... | H04W 12/08 |
| | | | | 726/5 |
| 2017/0249794 A1* | 8/2017 | Davis | ................. | H04L 63/0861 |

* cited by examiner

SECURED DELIVERY SYSTEM AND METHOD OF USING SAME

CROSS REFERENCE TO RELATED APPLICATIONS

This application is a continuation-in-part of U.S. patent application Ser. No. 15/938,846, filed Mar. 28, 2018, which claims priority to U.S. Provisional Patent Application No. 62/481,096, filed Apr. 3, 2017. In addition, this application claims priority to U.S. Provisional Patent Application No. 62/861,061, filed Jun. 13, 2019. All of said applications are incorporated herein by reference.

TECHNICAL FIELD

The present invention relates to security systems and delivery methods. An embodiment of the invention comprises a method of delivering goods. Another embodiment of the invention comprises a system for providing access to a secured structure, such as a residence. Another embodiment of the invention comprises the establishment of a network of artificial intelligence devices utilized to enhance security in the e-commerce sector.

BACKGROUND

Many consumers today purchase goods on the Internet from online retailers, and this form of shopping is expected to increase in the years to come. This form of shopping, which has become commonplace, requires the purchased goods to be shipped to the purchaser. Often, the goods are packaged and delivered to the residence of the purchaser while the purchaser is not home, and the packaged goods are merely left unsecured by the door of the purchaser's residence. Of course, such packages are prone to being stolen, resulting in significant financial loss to someone in the online retailer chain.

SUMMARY

Therefore, one object of the present invention is to provide a system that provides a secure and reliable means for delivering packages to a location. Another object of the invention is to provide a system that provides a system that tracks and confirms when a package has been securely delivered to the intended location. Another object of the invention is to provide a system capable of providing greetings, logistics, or directives specific to the scanned code, image or alphanumeric medium. These and other objects of the invention can be achieved in the various embodiments of the invention disclosed herein.

An embodiment of the invention comprises a system for shipping and delivering goods.

Another embodiment of the invention comprises a system for allowing authorized persons to access a secured structure, such as a residence.

Another embodiment of the invention comprises a doorbell apparatus comprising a scanner, a speaker, a microphone, a camera, and a mobile app. The mobile app can be utilized by merchants and allows the transfer of specific barcode(s) and other information. The app can create virtual keys, which may be sent to delivery or service personnel.

Another embodiment comprises a security system comprising a scanner device operatively connected to a computer processor and a non-transitory computer readable storage medium comprising software having programming instructions that, when executed, cause the computer processor to generate a virtual key and transmit the virtual key to a recipient, wherein the scanner device is adapted to read the virtual key from the recipient.

According to another embodiment of the invention, the virtual key can be a bar code, a graphic image, and/or an alphanumeric character.

According to another embodiment of the invention, the security system can include a portal for use by a variety of individuals and businesses, enabling the adaption of wireless devices, such as locks and control mechanisms, for access and logistics, such as causing a locking mechanism change between a locked position and an unlocked positioned. The locking mechanism can be operatively connected to a structure, the scanner device, a computer processor, and/or a cloud application server. A signal is transmitted to the locking mechanism causing the locking mechanism to reside in the unlocked position when the scanner device reads the virtual key from the recipient.

According to another embodiment of the invention, the structure can be the door of a building or residence, the door of a storage locker or lockbox, or a container lid.

According to another embodiment of the invention, the recipient can be a delivery service.

According to another embodiment of the invention, the virtual key expires after a predetermined period of time.

According to another embodiment of the invention, at least one artificial intelligence device can be operatively connected to the scanner device and the computer processor.

According to another embodiment of the invention, a network of connected artificial intelligence devices are operatively connected to the scanner device and the computer processor.

According to another embodiment of the invention, membership in the network is accepted via a unique identifier.

Another embodiment of the invention comprises a secured delivery system comprising a doorbell device comprising a scanner, speaker, microphone, camera, processor and a lock operatively connected to the structure. The lock is adapted for changing between a locked position, in which an interior of the structure cannot be accessed and an unlocked position, in which the interior of the structure can be accessed. The system includes a computer processor and a non-transitory computer readable storage medium comprising software having programming instructions that, when executed, cause the computer processor to generate a virtual key and transmit the virtual key to a delivery service, wherein the scanner is adapted to read the virtual key from the recipient and upon reading the virtual key transmits a signal to the lock or authenticates the virtual key and causes the cloud server to cause the lock to move to the unlocked position whereby the interior of the structure can be accessed.

According to another embodiment of the invention, the virtual key can be a bar code, a graphic image, and/or an alphanumeric character.

According to another embodiment of the invention, the virtual key expires after a predetermined amount of time or a predetermined number of uses.

According to another embodiment of the invention, the doorbell device further comprises a housing, an audio speaker, a camera, a microphone, and/or a light.

According to another embodiment of the invention, at least one artificial intelligence device is operatively connected to the scanner device and the computer processor.

According to another embodiment of the invention, a network of connected artificial intelligence devices is operatively connected to the scanner device and the computer processor.

According to another embodiment of the invention, membership in the network is accepted via a unique identifier.

Another embodiment of the invention comprises a method of delivery comprising a method of delivering an item purchased online comprising providing a scanner device, positioning the scanner device proximate a structure, and operatively connecting a lock to the scanner device and the structure. The lock is adapted for changing between a locked position, in which an interior of the structure cannot be accessed and an unlocked position, in which the interior of the structure can be accessed. Upon purchase of the item, a virtual key can be created and transmitted to a delivery service responsible for delivering the item to the purchaser of the item. The virtual key is presented to the scanner device. The scanner device reads the virtual key, and the lock is moved to the unlocked position whereby the interior of the structure can be accessed. The virtual key can be transmitted to the purchaser of the item.

According to another embodiment of the invention, a global navigation satellite system, such as The Global Positioning System (GPS), is used to interface with a fixed stationary location or multiple mobile devices to initiate access and/or activate messages and logistics when the devices are within a particular range of distance between each other. A host device can be linked to one or more mobile devices using the IP addresses of each mobile device, and one or more actions can be initiated when one of the linked mobile devices is within a predetermined distance of the host device. The GPS can also be used to perform logistics, such as entry management and unlocking or locking a door to a designated structure. Access to the designated structure can be based on positioning of a mobile device in proximity to the designated structure.

Another embodiment of the invention comprises a system for delivering items comprising a scanner device operatively connected to a computer processor and a non-transitory computer readable storage medium comprising software having programming instructions that, when executed, cause the computer processor to generate a virtual key comprising a graphic image and transmit the virtual key to a recipient, wherein the scanner device is adapted to read the virtual key from the recipient and upon reading the virtual key initiate an action selected from the group consisting of unlocking an access point to a structure and conveying a message to the recipient.

According to another embodiment of the invention, the virtual key further comprises at least one from the group consisting of a bar code and an alphanumeric character.

According to another embodiment of the invention, the system includes a locking mechanism adapted to change between a locked position and an unlocked positioned, the locking mechanism operatively connected to the access point of a structure and the scanner device, wherein the scanner device transmits a signal to the locking mechanism causing the locking mechanism to reside in the unlocked position when the scanner device reads the virtual key.

According to another embodiment of the invention, the access point of a structure can be a door of a building, a door of a residence, a door of a storage locker, a door of a lockbox, or a lid of a container.

According to another embodiment of the invention, the recipient can be a delivery service.

According to another embodiment of the invention, the scanner device can include a display screen, and a predetermined message is presented on the display screen when the scanner device reads the virtual key.

According to another embodiment of the invention, the scanner device comprises a speaker, and an audible message is broadcast from the speaker when the scanner device reads the virtual key.

Another embodiment of the invention comprises a system for delivering items comprising a host device operatively connected to an access point of a structure and at least one mobile device operatively connected to the host device. The host device and the at least one mobile device operatively connected to a global navigation satellite system, and the host device comprising a computer processor and a non-transitory computer readable storage medium comprising software having programming instructions that, when executed, cause the computer processor to initiate a logistic action when the global navigation satellite system detects that the mobile device is within a predetermined proximity of the host device. The logistic action can be unlocking the access point, opening a garage door or other door associated with the structure, providing instructions for delivery personnel, and/or other action relating to the structure. Alternatively, an actual address, location or landmark can be substituted for the host device.

According to another embodiment of the invention, the global navigation satellite system can be the Global Positioning System (GPS).

According to another embodiment of the invention, a first Internet Protocol (IP) address is associated with the host device, and a second Internet Protocol (IP) address is associated with the at least one mobile device, and the global navigation satellite system detects a geolocation of the host device using the first Internet Protocol (IP) address and detects a geolocation of the at least one mobile device using the second Internet Protocol (IP) address, whereby the global navigation satellite system detects when the at least one mobile device is within the predetermined proximity of the host device.

According to another embodiment of the invention, the host device can include a display screen, and a predetermined message is presented on the display screen when the global navigation satellite system detects that the mobile device is within a predetermined proximity of the host device.

According to another embodiment of the invention, the host device can include an audio speaker, and an audible message is broadcast from the audio speaker when the global navigation satellite system detects that the mobile device is within a predetermined proximity of the host device.

According to another embodiment of the invention, the access point of a structure can be a door of a building, a door of a residence, a door of a storage locker, a door of a lockbox, and/or a lid of a container.

According to another embodiment of the invention, the host device can comprise a housing, a camera, a microphone, and a light.

According to another embodiment of the invention, at least one artificial intelligence device can be operatively connected to the host device and the computer processor.

According to another embodiment of the invention, the system includes a network of operatively connected artificial

DETAILED DESCRIPTION OF PREFERRED EMBODIMENTS

Figure 1:
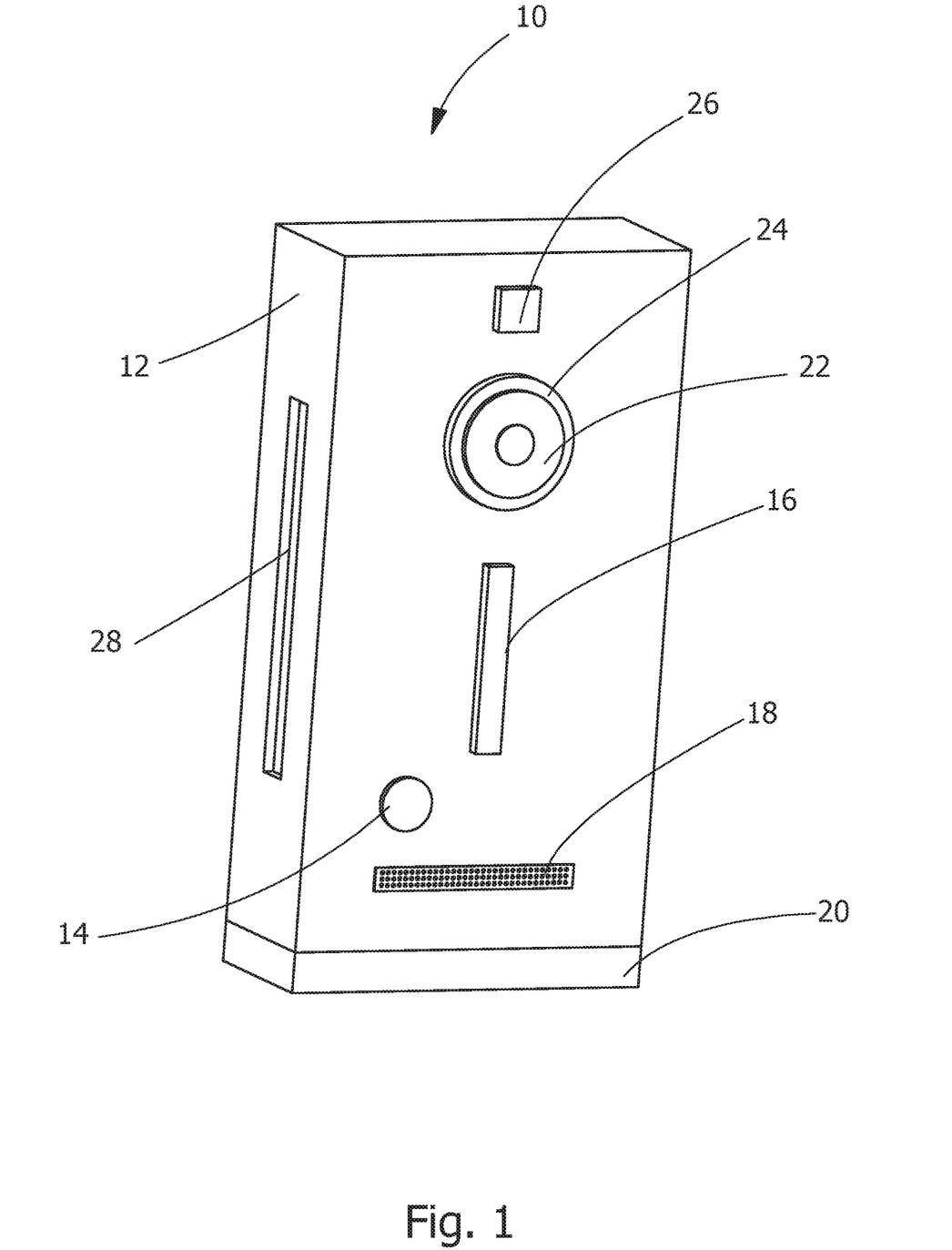
FIG. 1 is a perspective view of doorbell device according to a preferred embodiment of the invention.

A security system according to a preferred embodiment of the invention comprises a doorbell device shown generally at reference numeral 10 in FIG. 1. The doorbell device 10 comprises a housing 12, a motion sensor 14, at least one button 16 for activating the device 10, an audio speaker 18, a scanner 20, a camera 22, a microphone 24, and a light 26. The scanner 20 is capable of scanning bar codes, graphic images, such as photographs and drawings, and alphanumeric characters, such as letters and numbers.

The doorbell device 10 can be positioned on or proximate to a door, and the system can include a lock on the door. The doorbell device 10 can include a computing device comprising a computer processor, such as a microcontroller. The microcontroller is operatively connected to the scanner and the lock on the door via a wifi or Bluetooth signal. When the scanner 20 scans and processes a preprogrammed bar code, image, numbers or pictures, the microcontroller of the doorbell device 10 sends a signal unlocking the door lock. Also, when the scanner 20 processes a preprogrammed bar code, image, numbers or pictures, a signal is received from the cloud server or computer processor after authentication causing a locking device to open or access to be gained. The doorbell device 10 can include a card reader 28 adapted for electronically reading identification cards, credit cards, and the like. The microcontroller can comprise a computer processor and a non-transitory computer readable storage medium comprising software having programming instructions that, when executed, cause the microcontroller to carry out the above described steps. According to an embodiment of the invention, the software can be adapted for use as an application on a mobile smart phone. The doorbell device 10 can include and interface with one or more artificial intelligence devices.

According to another embodiment of the invention, the system comprises the doorbell device 10 or an independent scanner located near or secured to a door, or in proximity to or secured to a lock box or other storage apparatus. The lock box or other storage apparatus can be adapted to contain letters, packages, or other deliveries. The lock box can be located near an entry point, built into a residential or commercial structure, located in a free-standing structure such as a mailbox or decorative column, in the ground or other places within the range of a wifi/Bluetooth signal.

The independent scanner can have wireless or wired capabilities. The entire system can be wired, wireless or battery operated. A warning signal is delivered to an administrator(s) when any battery in the system becomes weak.

The independent scanner is capable of reading bar codes, images, numbers, pictures. Upon reading and processing a preprogrammed bar code, image(s), numbers or pictures, a lock on the door, lock box or other storage apparatus is unlocked. Also, upon reading and processing of preprogrammed bar code, image(s), numbers or pictures, an appointed message or a general message can be delivered audibly or via a text to a mobile phone or an e-mail.

The independent scanner is capable of voice recognition. The independent scanner can comprise numbered buttons for additional authentication or to route information or notification to the appropriate user/client/owner. The independent scanner can be located at an entry point or in proximity of a lock box, storage facility or compartment. The scanner can comprise a storage or lockbox container with a built-in scanner either wired, wireless or battery operated.

According to an embodiment of the invention, the system can include a card reader capable of reading identification cards, credit cards, and the like. The card reader can be incorporated in the doorbell device 10, or in the independent scanner.

According to an embodiment of the invention, the system can include a scanner/reader incorporated in another device connected to a storage container, box, storage facility or the like.

According to an embodiment of the invention, the system can include a secure storage container located on a property for the purpose of receiving packages and deliveries. The container can have an automatic locking and unlocking mechanism triggered directly by the scanner remotely via wireless technology or via a signal from a computer or cloud server. The storage container can be built into a structure, such as a house, located inside a column or other decorative structure, or can be free standing.

The storage container or lock box can be equipped with a scanner.

According to an embodiment of the invention, the system can include a computer processor and a non-transitory computer readable storage medium comprising software having programming instructions that, when executed, cause a computer processor to carry out various steps described herein. According to an embodiment of the invention, the software can be adapted for use as an application on a mobile smart phone.

The software can enable a user to create a virtual key. The virtual key can be a bar code, a graphic image such as a photograph, and/or an alphanumeric code comprised of letters and/or numbers. In a preferred embodiment, the virtual key comprises a graphic image and an underlying alphanumeric code, and the scanner is adapted to read graphic images and alphanumeric characters. If weather or other issues prevent the scanner from being able to read the graphic image, the scanner can read the alphanumeric code. In another embodiment, the virtual key comprises a graphic image and an underlying code that may be used for authentication of the image, and the scanner is adapted to read graphic images and bar codes. If weather or other issues prevent the scanner from being able to read the graphic image, the scanner can read the alphanumeric code. When the scanner reads the virtual key it initiates one or more actions, such as unlocking an associated lock to allow access to a secured location or container, or transfer data to a computer processor or a cloud server to authenticate the key or perform the functions enabling access.

Notifications from the scanner can be sent wirelessly to the appropriate respondent enabling a remote signature receipt. The software application is capable of voice recognition. The software can create bar codes, images, and pictures and can forward them, such as by text or e-mail, to allow access to authorized visitors, deliveries, service personnel, and the like.

The software application can deliver a specific message for the specific bar code, image, picture and/or number(s) to input. The software enables remote programming of the scanner, lockbox, storage etc.

The software application enables remote two-way communication via wireless mobile devices. The software application coordinates the actions of all features of the system. The software application can receive data from a plurality of mobile devise or fixed devices via Internet, wifi, or other wireless or wired means.

The software enables the programmer to create a virtual key, which can be a unique barcode, character, picture, letter(s) and/or number(s). A corresponding virtual key is sent to designated recipient(s), such as delivery or service personnel. When scanned, access is gained, or a message is delivered from the system. The software allows access and messages to expire as programmed in accordance with each unique barcode, character, picture, letter(s) and/or number(s).

Each virtual key can be programmed to have a predetermined limited life span. Upon creating a virtual key, the user can select a predetermined date and time at which the virtual key will expire and no longer provide access.

The software can require a driver's license scan or card reader for the purposes of verifying entry. The software can time stamp every activation and document identity when desired. The software allows notifications to be sent to one or more mobile devices.

The software enables the person notified wirelessly to forward a unique barcode, character, picture, letter(s) and/or number(s) etc. to one or more recipients to provide access or messages.

The software can send a delivery confirmation to the sender, the delivery service and/or others involved. The software allows owners to change access according to need for residents or guests, thereby eliminating the need to change locks.

The software enables preprogrammed messages, directives to different individuals in accordance with the corresponding scan. The software enables a remote signature, symbol, and/or image to be sent from a handheld device to the system, enabling the delivery person to obtain such through the scanner or doorbell or other system apparatus.

The software can allow a mobile or stationary transmission of a barcode, image, etc. for the purposes of access, message and/or information. The software has voice recognition and artificial intelligence, enabling dissemination to appropriate users and interface with an authorized delivery person or guest. The artificial intelligence can provide information, directives, and/or greetings etc.

The software application enables all devices in the system to be synchronized in a secure manner by usernames and passwords or similar identification protocol. The system can be referred to as "Virtual Access Logistics Technology" (VALT). The system comprises:

Scanner/Scanner/Doorbell/Light apparatus mounted in proximity to a door, lockbox, storage, compartment or other secured location or container.

Scanner can include illumination, camera, speaker, microphone, alarm, and reader(s) for cards, mobile phones, and mobile devices.

Controller comprised of a catalogue of keys for creation of a variety of selected inputs to be sent or transmitted to the scanner or to an individual(s) with a remote device or to an email address, or other address. Each virtual key, bar code, alphanumeric input has the capability of triggering a corresponding message, directive, etc. from the system when a scan is performed.

Controller(s) consisting of programmable devices (computer, laptop, cell phone, tablet etc.) running a software application controlling one or more systems of the invention.

Lock box(s), storage, compartments for storage of deliveries that interface with the controller and the scanner.

Software with a menu of features to customize the VALT system for uses such as managing construction sites and deliveries, providing remote contact by real estate agents with prospective buyers, forwarding an electronic code/virtual key for access utilizing the scanners, and serving property owners with a secure method of receiving deliveries.

A camera for monitoring package deliveries, recording access and egress, and date stamping time of events.

Two-way communication for wireless communication between person initiating scan and appropriate person(s).

Motion detection for activation of system or the pressing of a button.

If a delivery package requires a signature and the occupant is not home, the scan will enable the system to notify the occupant and an electronic signature can be forwarded to the deliverer as well as remote access triggered to a selected structure, such as a lockbox, storage, compartment.

An app enabling networking of artificial intelligence devices within or outside the Wi-Fi network.

An embodiment of the invention comprises a general-purpose computer that has been programmed to perform particular functions as a specific purpose computer pursuant to the instruction from program software, such as the software described above.

According to an embodiment of the invention, when a package, letter or other delivery is anticipated, the source of the delivery, which can be an online retailer, identifies itself as a VALT application member enabling the source to select delivery options which may include the provision of a virtual key to the retailer or carrier for delivery. The owner may designate specific delivery instructions, access, access points for each delivery. The virtual key can be a predetermined bar code(s), graphic image(s), and/or other access authorizing input. When the purchaser receives the access authorizing input, that input is entered into the VALT system. The delivery source can also provide the authorizing delivery input (virtual key) to a delivery person responsible for delivering the package, letter, or other delivery to the purchaser. Alternatively, the purchaser can provide the virtual key to the delivery person. The VALT system stores the authorizing input until an anticipated match is received from a delivery person (bar code, image, numbers, etc.).

The VALT system scanner scans the input from the delivery person to determine if it matches the authorizing input that had been entered by the purchaser. When a match occurs, the VALT system is triggered to initiate one or more of the following:

Provide access (such as by unlocking a door or container)
Deliver a preprogrammed message to the source of the delivery
Establish contact with appropriate individual(s)
Date stamp delivery
Notify appropriate individuals of delivery (such as the intended recipient)
Initiate two-way communication
Activate camera Activate motion detection Activate an artificial intelligence device which will then interface with the VALT system providing instructions, directives, etc.

In an alternative embodiment of the invention, the intended recipient can create the authorizing input, such as a bar code(s) or image(s), and the intended recipient sends the authorizing input to the delivery source. For example, an individual can create a personalized authorizing input that the individual can provide to an online retailer at the time of making a purchase from the online retailer.

According to an embodiment of the invention, a system administrator has the ability to create barcodes, images, etc. or other authorizing inputs that can be sent for the purpose of access:

Deliveries
Guest
Family
Real Estate Sales
Service and repair personnel, etc.
Property management An administrator/owner can create label and provide the label to a number of vendors. The label can be created by the sender using identified numbers or codes provided by the sender such as credit card number, number provided by administrator/owner at the time of order, and/or image selected by the administrator/owner at the time of order.

According to an embodiment of the invention, the VALT system has the capability of sending a signal to a variety of access points. One of which can be mail compartments, storage compartments, entry, or other. Once access is provided, the access information becomes invalid, or programmed to expire at a designated time.

The VALT system can include the ability to deliver messages or information associated with each scan. The system can also include voice recognition and AI (artificial intelligence), either built in or networked with other external AI devices, enabling it to conduct inquiries, provide information, and respond to inquiries.

The VALT system can be connected to a data base for the purpose of reading drivers' licenses or other Identification cards or badges. The VALT system date stamps, stores and configures a report of all activity. The VALT system confirms deliveries, date stamping each, and provides access to package containers, storing them safely.

According to an embodiment of the invention, the two-way communication enables remote communication with the owner/administrator and the person triggering the scan.

Locking compartments or storage compartments for the VALT system can be built in the structure or located in proximity to a structure in range of the VALT wireless input, the cloud server running the application, or a mobile device running the application.

Figure 2:
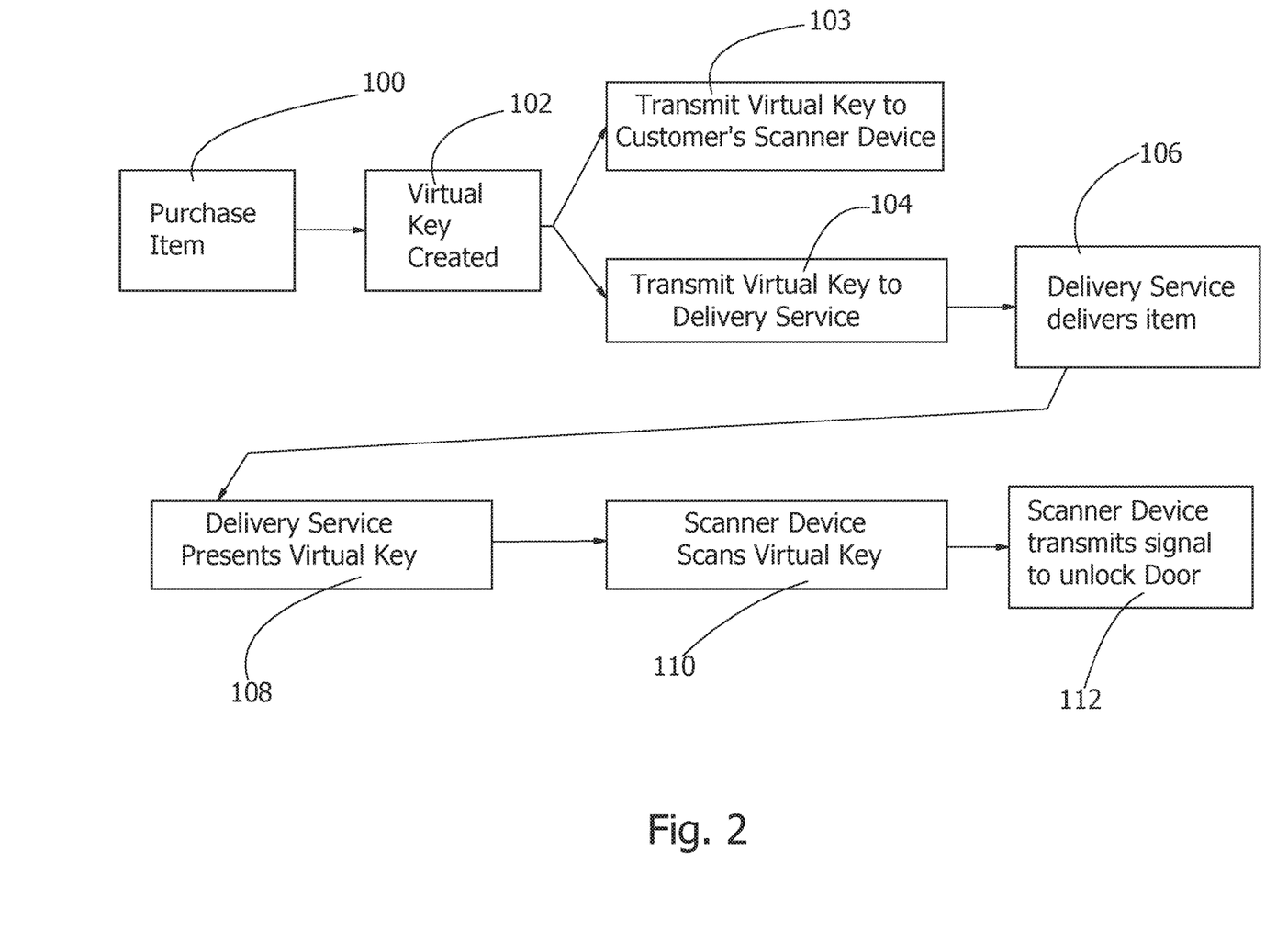
FIG. 2 illustrates a method of using the doorbell device of FIG. 1, according to a preferred embodiment of the invention.

FIG. 2 illustrates another embodiment of the invention. In the embodiment of the invention shown in FIG. 2, the VALT system comprises a scanner device, such as the doorbell device 10 described above. Upon the purchase of an item from an online retail seller platform 100, a virtual key is created 102 and transmitted to the doorbell device 10 of the item purchaser 103. The virtual key is also sent to the retailer or delivery service that is to deliver the item to the purchaser 104 if a VALT membership is confirmed. Upon delivering the item to the purchaser's location 106, the delivery service presents the virtual key 108, which can be a bar code that is scanned by the doorbell device. Upon scanning the virtual key 110, the VALT scanner doorbell device 10 transmits a signal to the application server, computer processor or door lock that unlocks the door 112. The VALT system can program the virtual key so that it expires after a predetermined number of uses at the doorbell device 10. For example, the virtual key can expire after it has been scanned one time by the doorbell device 10. As such, the virtual key cannot be used again. Alternatively, the virtual key can be programmed to expire after a predetermined period of time.

According to an embodiment of the invention, the VALT system can be used in the field of real estate sales. Real estate agents can send access information wirelessly in the form of a bar code or image to a potential buyer visiting a home for sale. The potential buyer can input the access information into the system to unlock the door of the home and gain entrance. The VALT system can also confirm the identity of the potential buyer via driver's license scan. The system can monitor access via built in camera(s), conduct remote tour via interior cameras and monitor exit.

In another embodiment of the invention, the VALT system can be used to receive service providers at a location, such as building contractors, sub-contractors, repair men, cleaning staff and other service personnel doing work at a residence. The homeowner can use the system to create access information and provide the information to the service providers who input the information into the system to gain access to the residence.

Another embodiment of the invention comprises a mobile app that allows for the creation of a virtual key to enable the transfer of keys for accessing a structure.

According to an embodiment of the invention, the VALT system comprises a doorbell having a scanner and a mobile app that can be utilized by merchants. The mobile app allows the transfer of specific barcode or other information. Also, included in the app is the ability to create virtual keys which may be sent to delivery personnel or service people. An unlocking component is associated with the creation of the virtual keys.

According to an embodiment of the invention, the virtual key expires at a predetermined time selected by the creator of the virtual key. The virtual key can be securely sent to a cell phone for access by various personnel.

In another embodiment of the invention, multiple artificial intelligence (AI) devices communicate with one another in an established network. This allows messages to be shared, transmitted, and stored in other AI devices for both security and information purposes. If a delivery occurs and the recipient or occupant is not available, the VALT system communicates with the AI device with a notification that may be stored or sent to another AI device. According to an embodiment of the invention, membership in the network can be accepted via programming of a code, IP address, or some other identifier that can be accepted by another device or devices for shared communication. The information may extend to the merchant who has the ability to send a message to an AI device regarding delivery, shipping, or order information. The AI device may also communicate instructions to the delivery person via the VALT scanner or independently, in addition to storing important information from a delivery or service person.

Another embodiment of the invention comprises a system for delivering merchandise comprising an online membership platform on which a user, at the time of creating a membership, enters personal data, such as name, address, and credit card information. The user can create a virtual key, and enter special instructions for delivery personnel, such as the user's preferred location for leaving packages. The membership platform can be accessed at the time of making an online purchase. For example, an online retailer can make customers aware of the membership platform and provide a link to the platform when customers are about to make a purchase from the online retailer. Returning customers who have already created a membership can enter a password to bring up their existing membership. The system includes a scanner device that can read bar codes, images, and alphanumeric symbols. The scanner device can be encoded with the personal data of a particular user, including the user's "virtual key." The online retailer delivers the encoded scanner device to the particular user when the user creates a membership on the membership platform.

The user positions the scanner device proximate an access door of the user's home, business or other location to which the user has purchased from the online retailer is to be delivered. The scanner device can include adhesive or other attachment means that allows the scanner device to be securely attached to the user's home, storage container or other secure location. The scanner device can include a speaker, microphone, a display screen and a camera. Preferably, the display screen is a touch screen. When a delivery is scanned, confirmation of receipt of the package is transmitted to the online retailer and the user. Upon scanning of the package, the scanner device reads the virtual key.

If the user entered special delivery instructions on the membership platform, the instructions (such as "place the package on the back porch") can be broadcast audibly via the speaker and/or presented visually as text on the touch screen. If the delivery service personnel has an issue and wishes to communicate with the user, he can do so using the microphone. The online retailer can offer an "upgraded" scanner device that includes means for installing an electronic lock on the user's access door that is operatively connected to the scanner device. Upon scanning of the package by the scanner device, the scanner device reads the virtual key, which triggers the electronic lock on the access door to unlock for a predetermined amount of time to allow the delivery service personnel to place the package inside the user's home.

According to another embodiment of the invention, the VALT application can maintain a record of every activation and access key. A record is maintained of each activation that includes the virtual key utilized for the activation, the IP address and authorized user of the mobile device of the individual and/or entity utilizing the virtual key for access, the duration of stay, and the date/time of departure and/or termination of the virtual key.

According to another embodiment of the invention, the VALT application can include voice recognition technology and the virtual key comprises an audible recording of a series of numbers, words and/or sounds, which can be created by the administrator. The voice recognition technology can be operatively connected to the scanner device whereby the scanner device is adapted to receive and process voice data. When the scanner device receives and processes the audible sound of the virtual key one or more actions can be initiated, such as unlocking a door to a structure and/or providing a greeting and/or logistics information.

According to another embodiment of the invention, access to the VALT application can be protected by biometric recognition of the user. Access to the VALT application is granted when certain biometric data of the user is authenticated. Authentication can be achieved by scanning fingerprints and/or other physical features of the user.

According to another embodiment of the invention, the VALT system can include a secondary power source that enables the system to continue working in the event of a power outage. The secondary power source can (a) serve as a backup power source, (b) charge a battery capable of powering the system when electricity is not available, and/or (c) contain a backup energy/power device capable of powering the system. The secondary power source can comprise one or more solar (photovoltaic) panels.

According to another embodiment of the invention, the virtual key can trigger a drone device that retrieves a package and takes it to a designated storage area. Rather than the virtual key being used to access a structure, the key activates a drone device that flies to the delivery area and retrieves the package when the key is scanned.

Another embodiment of the invention comprises a system that can be referred to herein as "Mapping and Logistics Technology" (MALT). The MALT system can be an optional or additional feature of the VALT system. In accordance with the MALT system, a global navigation satellite system, such as The Global Positioning System (GPS), is used to interface with multiple devices to initiate access and/or activate messages or logistics when devices are within a particular range of distance between each other. The particular range of distance necessary to initiate access and/or messages or logistics can be entered into the MALT system. The range of distance can be for example five feet, or it can be greater or less. The GPS detects the geo-location of each device, and when it is determined that the multiple devices are within the particular range of distance of each other a number of different actions can be initiated, such as granting access to a structure and/or activate messages and logistics.

The MALT system, utilizing a standard GPS service, can establish a relationship between a host device and one or more mobile devices running the VALT application. The mobile devices can be mobile smartphones. The host device comprises a computer processor and is linked to each mobile device using the IP address of each mobile device. When the mobile device comes within proximity of the host device, the host device initiates one or more actions, such as providing access to a structure and/or providing a greeting and/or logistics information. This feature eliminates the need for optics and/or near-field communications (NFC). When utilized in delivery services it enables the carrier to simply arrive and come within proximity of the host device.

In another embodiment, the MALT system, utilizing a standard GPS service, can establish a relationship between a mobile device and a specific landmark. When the mobile device is within proximity of the specific landmark, access or logistics are activated utilizing. The mobile devices can be mobile smartphones or a carriers diad (mobile device) which can be utilized for access and logistics. This feature eliminates the need for optics and/or near-field communications (NFC). When utilized in delivery services it enables the carrier to simply arrive and come within proximity of the landmark.

The MALT system can interface with devices of VALT members. Information and logistics can be programmed into each carrier's mobile device and when the carrier's mobile device is within proximity of a landmark or address, access and directives are initiated.

According to a preferred embodiment, the MALT system can utilize a virtual key for added security. The host device can be the doorbell device 10 described above. The doorbell device is linked to a mobile device using the IP address of the mobile device. In addition, a virtual key can be created and transmitted to the linked mobile device. When the mobile device comes within proximity of the doorbell device and the virtual key is read by the doorbell device, the host device initiates one or more actions, such as unlocking the door to the structure operatively connected to the doorbell device and/or providing a greeting and/or logistics information. In order to initiate the action, the linked mobile device must be within the particular predetermined range of distance of the doorbell device and the doorbell device must read the virtual key from the mobile device. This provides an added layer of security. The virtual key can be a bar code, a graphic image, such as a photograph, and/or an alphanumeric code comprised of letters and/or numbers. Preferably, the virtual key comprises a graphic image and an alphanumeric code. If weather or other issues prevent the doorbell device from being able to read the graphic image, the doorbell device can read the alphanumeric code.

In a method according to a preferred embodiment of the invention, the MALT system can be used in a delivery process. When delivery of an item, such as package or letter, is anticipated, a virtual key is created and transmitted, such as by e-mail or text, to the delivery service responsible for delivering the item. The virtual key preferably comprises a graphic image and an underlying alphanumeric code. The virtual key can be created by the recipient of the item by taking and selecting a photograph and entering a series of alphanumeric characters. Alternatively, the virtual key can be created by the seller of the item to be delivered, and the seller transmits the virtual key to the recipient and the delivery service responsible for delivering the item. The delivery service transmits the virtual key to the mobile device of the delivery person delivering the item. In addition, the delivery person's mobile device is linked to the recipient's doorbell device via the IP address of the mobile device. The doorbell device is provided at the home of the recipient. The doorbell device can be operatively connected to an access point of a structure, such as the front door of the recipient's home whereby the doorbell device can lock and unlock the front door. When the delivery person arrives at the recipient's home, the delivery person presents the virtual key on his mobile device to the doorbell device. When the doorbell device detects that the delivery person's linked mobile device is within the required range of distance and reads the virtual key on the mobile device, the VALT system initiates one or more actions, such as provide access (such as by unlocking the front door), provide a preprogrammed message to the delivery person, contact the recipient or other appropriate individual(s), date stamp delivery, notify appropriate individuals of delivery (such as the intended recipient), initiate two-way communication between the recipient and the delivery person, activate the camera, activate motion detection, and activate an artificial intelligence device which interfaces with the VALT system providing instructions, directives, etc.

The MALT feature can be activated or canceled via the VALT application. VALT offers at least two levels of authentication and convenience: (1) image identification with a code to prevent the forwarding or transfer of the image, and (2) code detection via NFC for the purposes of verifying the image code. The use of GPS makes deliveries interactional and intuitive by providing immediate access and/or information or directives.

Handheld devices and GPS provide advantages over GPS and vehicle location. The MALT application can use GPS to provide delivery confirmation when the mobile device of the carrier and the VALT host are in proximity.

The GPS application can comprise a device capable of being tracked by GPS. The device can be a mobile device or other device capable of being tracked by GPS. When the GPS device and the host device are in proximity, access and/or messaging and logistics can be triggered.

According to another embodiment of the invention, access and/or messaging is triggered when a linked mobile device is within a predetermined distance of a particular address. In such embodiment, a host device is not needed.

A secured delivery system and methods of using same are described above. Various changes can be made to the invention without departing from its scope. The above description of preferred embodiments of the invention are provided for the purpose of illustration only and not limitation—the invention being defined by the claims.

What is claimed is:

1. A system for delivering items comprising:
a scanner device operatively connected to a computer processor; and
a non-transitory computer readable storage medium comprising software having programming instructions that, allow an owner to create a virtual key comprising a graphic image and transmit the virtual key to a recipient, wherein the virtual key is created by the owner selecting a photograph;
wherein the scanner device is adapted to read the photograph from the recipient and upon reading the photograph initiate an action selected from the group consisting of unlocking an access point to a structure and conveying a message to the recipient;
wherein the scanner device comprises a display, and a predetermined message is presented on the display when the scanner device reads the photograph; and
wherein the scanner device comprise a speaker, and an audible message is broadcast from the speaker when the scanner device reads the photograph.

2. The system according to claim 1, wherein the virtual key further comprises at least one from the group consisting of a bar code and an alphanumeric character.

3. The system according to claim 1, further comprising a locking mechanism adapted to change between a locked position and an unlocked positioned, the locking mechanism operatively connected to the access point of a structure and the scanner device, wherein the scanner device transmits a signal to the locking mechanism causing the locking mechanism to reside in the unlocked position when the scanner device reads the virtual key.

4. The system according to claim 3, wherein the access point of a structure comprises at least one selected from the group consisting of a door of a building, a door of a residence, a door of a storage locker, a door of a lockbox, and a lid of a container.

5. The system according to claim 3, wherein the recipient comprises a delivery service.

6. The system according to claim 1, wherein the virtual key expires after a predetermined period of time.

7. A system for delivering items comprising:
(a) a host device operatively connected to an access point of a structure and adapted to unlock the access point;
(b) at least one mobile device operatively connected to the host device;
(c) the host device, and the at least one mobile device operatively connected to a global navigation satellite system comprising a Global Positioning System (GPS) configured to determine a proximity of the host device to the at least one mobile device, and the host device comprising a computer processor and a non-transitory computer readable storage medium comprising software having programming instructions that, when executed, cause the computer processor to unlock the access point when the global navigation satellite system detects that the mobile device is within a predetermined proximity of the host device via the GPS;
(d) a first Internet Protocol (IP) address is associated with the host device, and a second Internet Protocol (IP) address is associated with the at least one mobile device, and the global navigation satellite system detects a geolocation of the host device using the first Internet Protocol (IP) address and detects a geolocation of the at least one mobile device using the second Internet Protocol (IP) address, whereby the global navigation satellite system detects when the at least one mobile device is within the predetermined proximity of the host device;
wherein the host device comprises a display screen, and a predetermined message is presented on the display screen when the global navigation satellite system detects that the mobile device is within a predetermined proximity of the host device;
wherein the host device comprises an audio speaker, and an audible message is broadcast from the audio speaker when the global navigation satellite system detects that the mobile device is within a predetermined proximity of the host device;
wherein the access point of a structure comprises at least one selected from the group consisting of a door of a building, a door of a residence, a door of a storage locker, a door of a lockbox, and a lid of a container;
wherein the host device further comprises a housing, a camera, a microphone, and a light
(e) at least one artificial intelligence device operatively connected to the host device and the computer processor; and
(f) a network of operatively connected artificial intelligence devices, wherein the network is operatively connected to the scanner device and the computer processor, wherein membership in the network is accepted via a unique identifier.

8. A method of delivery comprising the steps of:
(a) providing a scanner device including a display and a speaker;
(b) positioning the scanner device proximate a structure;
(c) providing a lock operatively connected to the scanner device and a structure, the lock adapted for changing between a locked position wherein an interior of the structure cannot be accessed and an unlocked position wherein the interior of the structure can be accessed;
(d) purchasing an item;
(e) allowing an owner to create a virtual key comprising a graphic image,. wherein the virtual key is created by the owner selecting a photograph;
(f) transmitting the photograph to a delivery service responsible for delivering the item to a purchaser of the item;
(g) presenting the photograph to the scanner device whereby the scanner device reads the photograph;
(h) presenting a predetermined message on the display when the scanner reads the photograph;
(i) broadcasting an audible message from the speaker when the scanner device reads the photograph; and
(j) moving the lock to the unlocked position whereby the interior of the structure can be accessed in response to the scanner device reading the photograph.

9. The method of delivery according to claim 8, further comprising the step of transmitting the virtual key to the purchaser of the item.

10. The system according to claim 1, wherein the virtual key is created by the programmer taking and selecting the photograph.

11. The method of delivery according to claim 8, wherein the virtual key is created by the programmer taking and selecting the photograph.

* * * * *